(12) United States Patent
Brinkmann et al.

(10) Patent No.: US 9,546,608 B2
(45) Date of Patent: Jan. 17, 2017

(54) METHOD FOR CYLINDER EQUALIZATION OF A LAMBDA-CONTROLLED INTERNAL COMBUSTION ENGINE, IN PARTICULAR OF A MOTOR VEHICLE

(71) Applicant: Robert Bosch GmbH, Stuttgart (DE)

(72) Inventors: Christian Brinkmann, Bietigheim-Bissingen (DE); Wolfgang Tiebel, Stuttgart (DE); Holger Jessen, Ludwigsburg (DE); Roman Meyer, Stuttgart (DE); Thomas Federlein, Kirchheim am Neckar (DE)

(73) Assignee: Robert Bosch GmbH, Stuttgart (DE)

( * ) Notice: Subject to any disclaimer, the term of this patent is extended or adjusted under 35 U.S.C. 154(b) by 325 days.

(21) Appl. No.: 14/293,321

(22) Filed: Jun. 2, 2014

(65) Prior Publication Data

US 2014/0358403 A1 Dec. 4, 2014

(30) Foreign Application Priority Data

Jun. 4, 2013 (DE) .................. 10 2013 210 346
Dec. 20, 2013 (DE) .................. 10 2013 227 023

(51) Int. Cl.
*F02D 41/00* (2006.01)
*G01M 15/00* (2006.01)
(Continued)

(52) U.S. Cl.
CPC ........... *F02D 17/02* (2013.01); *F02D 41/0085* (2013.01); *G01M 15/104* (2013.01);
(Continued)

(58) Field of Classification Search
CPC .............. F02D 41/0085; F02D 41/0097; F02D 41/1498; F02D 2200/101; F02D 41/1406; F02D 41/1408; F02D 41/1454; F02D 41/1479; F02D 2200/0614; F02D 2200/0616; G01M 15/104; G01M 15/046
(Continued)

(56) References Cited

U.S. PATENT DOCUMENTS 4,445,326 A * 5/1984 Lyon ................... G01M 15/104
60/277
4,532,592 A * 7/1985 Citron ................... F02D 41/008
123/339.19
(Continued)

FOREIGN PATENT DOCUMENTS

DE 195 27 218 6/1996
DE 2011 086 150 5/2013

*Primary Examiner* — Thomas Moulis
(74) *Attorney, Agent, or Firm* — Norton Rose Fulbright US LLP; Gerard Messina (57) ABSTRACT

In a method for cylinder equalization of a lambda-controlled internal combustion engine of a motor vehicle, cylinders to be tested are trimmed with respect to the mixture composition of metered fuel, and the cylinder equalization is carried out on the basis of an uneven running or uneven running change of the internal combustion engine caused by the trimming. In addition, the uneven running or uneven running change is detected in a reference state of the internal combustion engine. The uneven runnings or uneven running changes detected during successive trimmings of the cylinders to be tested are and compared to the uneven running values detected in the reference state.

17 Claims, 3 Drawing Sheets

(51) Int. Cl.
   *F02D 17/02* (2006.01)
   *G01M 15/10* (2006.01)
   *F02D 41/14* (2006.01)

(52) U.S. Cl.
   CPC ...... *F02D 41/0097* (2013.01); *F02D 41/1495* (2013.01); *F02D 41/1498* (2013.01); *F02D 2200/101* (2013.01)

(58) Field of Classification Search
   USPC ......... 123/436, 673, 478–479; 701/102–104, 701/109, 111; 73/114.45, 114.72
   See application file for complete search history.

(56) References Cited

U.S. PATENT DOCUMENTS

| | | | | |
|---|---|---|---|---|
| 4,841,765 A * | 6/1989 | Blanke | ............... | F02D 41/1474 73/114.45 |
| 4,915,079 A * | 4/1990 | Holmes | ............... | F02D 41/1408 123/406.24 |
| 5,690,072 A * | 11/1997 | Meyer | ............... | F02D 41/1405 123/436 |
| 5,906,187 A * | 5/1999 | Heuer | ............... | F02D 41/0085 123/436 |
| 6,338,326 B1 * | 1/2002 | Ebeling | ............... | G01M 15/11 123/198 F |
| 6,584,834 B1 * | 7/2003 | Lehner | ............... | F02D 41/1498 73/114.08 |
| 7,013,871 B2 * | 3/2006 | Zhu | ............... | F01N 3/2006 123/406.21 |
| 7,021,287 B2 * | 4/2006 | Zhu | ............... | F01N 3/2006 123/406.22 |
| 7,027,910 B1 * | 4/2006 | Javaherian | ............... | F02D 41/0085 123/406.24 |
| 7,195,008 B2 * | 3/2007 | Annoura | ............... | F02D 41/008 123/674 |
| 7,654,133 B2 * | 2/2010 | Hoshi | ............... | G01M 15/05 73/114.32 |
| 7,676,317 B2 * | 3/2010 | Aliakbarzadeh | ...... | F02D 41/008 701/103 |
| 7,721,711 B2 * | 5/2010 | Kurosawa | ............ | F02D 41/0085 123/434 |
| 7,849,844 B2 * | 12/2010 | Rosel | ............... | B01D 53/9409 123/672 |
| 7,886,523 B1 * | 2/2011 | Legare | ............... | F02D 41/008 60/274 |
| 7,926,331 B2 * | 4/2011 | Tsutsumi | ............ | F02D 41/0025 73/114.38 |
| 8,347,700 B2 * | 1/2013 | Azadeh | ............... | F02D 41/008 73/114.31 |
| 8,620,564 B2 * | 12/2013 | Hakariya | ............ | F02D 41/0085 123/673 |
| 8,695,568 B2 * | 4/2014 | Yoshikawa | ......... | F02D 41/0085 123/436 |
| 9,026,341 B2 * | 5/2015 | Noda | ............... | F02D 41/0085 123/673 |
| 9,217,384 B2 * | 12/2015 | Azadeh | ............... | F02D 41/008 |
| 2001/0020465 A1 * | 9/2001 | Baeuerle | ............... | F02D 35/027 123/406.23 |
| 2002/0121268 A1 * | 9/2002 | Graf | ............... | F02D 41/008 123/435 |
| 2003/0159677 A1 * | 8/2003 | Uhl | ............... | F02D 41/1498 123/436 |
| 2005/0022797 A1 * | 2/2005 | Ikemoto | ............... | F02D 41/0032 123/673 |
| 2005/0056255 A1 * | 3/2005 | Harris | ............... | F02D 41/0085 123/435 |
| 2005/0071073 A1 * | 3/2005 | Ueda | ............... | F02D 37/02 701/101 |
| 2007/0199551 A1 * | 8/2007 | Porten | ............... | F02D 41/1498 123/673 |
| 2008/0009997 A1 * | 1/2008 | Ketterer | ............... | F02D 41/0085 701/101 |
| 2008/0017168 A1 * | 1/2008 | DeGroot | ............... | F02D 41/0085 123/436 |
| 2009/0025695 A1 * | 1/2009 | Wolber | ............... | F02D 41/0085 123/527 |
| 2009/0037083 A1 * | 2/2009 | Scheffler | ............ | F02D 41/0085 701/104 |
| 2009/0326787 A1 * | 12/2009 | Hofmeister | ......... | F02D 41/0085 701/104 |
| 2010/0082297 A1 * | 4/2010 | Turin | ............... | F02D 41/0085 702/183 |
| 2012/0004803 A1 * | 1/2012 | Azadeh | ............... | F02D 41/0085 701/34.4 |
| 2012/0255531 A1 * | 10/2012 | Kinose | ............... | F02D 41/0085 123/673 |
| 2012/0283936 A1 * | 11/2012 | Hashemi | ............... | F02D 41/008 701/113 |
| 2013/0118243 A1 * | 5/2013 | Jessen | ............... | F02D 41/0085 73/114.45 |
| 2013/0180511 A1 * | 7/2013 | Hess | ............... | F02D 41/0085 123/704 |
| 2014/0156170 A1 * | 6/2014 | Eser | ............... | F02D 41/0085 701/103 |
| 2014/0299096 A1 * | 10/2014 | Rupp | ............... | F02D 41/008 123/344 |
| 2014/0326227 A1 * | 11/2014 | Eser | ............... | F02D 41/0085 123/673 |
| 2015/0046063 A1 * | 2/2015 | Jammoussi | ......... | F02D 41/1495 701/103 |
| 2015/0345419 A1 * | 12/2015 | Glugla | ............... | F02D 35/028 123/299 |
| 2016/0053701 A1 * | 2/2016 | Iwase | ............... | F02D 41/1454 123/673 |
| 2016/0161369 A1 * | 6/2016 | Mueller | ............... | F02D 41/1498 73/114.77 |

* cited by examiner

METHOD FOR CYLINDER EQUALIZATION OF A LAMBDA-CONTROLLED INTERNAL COMBUSTION ENGINE, IN PARTICULAR OF A MOTOR VEHICLE

BACKGROUND OF THE INVENTION

1. Field of the Invention

The present invention relates to a device, a method and a corresponding computer program for the cylinder equalization of a lambda-controlled internal combustion engine, in particular of a motor vehicle.

2. Description of the Related Art

In a lambda-controlled internal combustion engine, for example, a gasoline engine including a three-way exhaust catalytic converter and a lambda sensor, the air-fuel ratio is regulated during homogeneous operation by the lambda control in such a way that the lambda mean value of the mixture composition for all cylinders has the value lambda=1.0 and thus ensures a low-emission operation.

Unequal distribution of the lambda values of individual cylinders takes place due to metering tolerances in the fuel metering of the internal combustion engine, which is carried out with the aid of injectors, for example, and due to cylinder-individual differences, which are caused by system tolerances, in the mixture composition, i.e., the cylinder charge with fuel and air, although the mean value for all cylinders assumes the desired lambda value 1.0. Thus, for example, in a four-cylinder engine, lambda (cylinder 1)=1.1, lambda (cylinder 2)=0.9, lambda (cylinder 3)=1.2, and lambda (cylinder 4)=0.8 may be provided, which corresponds as a whole to a mean value of lambda=1.0.

This imbalance between the individual cylinders results in an increase of the fuel consumption and an increase of exhaust gas emissions. The emission legislation which is applicable in many countries therefore prescribes exhaust gas diagnosis or regulating strategies which counteract or prevent this imbalance.

A generic method is known from Published German patent application document DE 195 27 218 A1, in which a possible unequal distribution of cylinder lambda values is derived from a detected uneven running of the internal combustion engine, i.e., the change of the engine torque after a sudden leaning. This is based on the technical effect that there is an unambiguous relationship between the mixture composition and a crankshaft acceleration resulting from the combustion. Cylinder-individual lambda differences of individual cylinders are adapted in that the cylinders are successively leaned and a cylinder-individual feature for trimming the respective cylinder is derived from the detected uneven running change. It is additionally ensured by the simultaneous enrichment of the non-leaned cylinders that the mean value of lambda remains constant at 1.0 for all cylinders.

BRIEF SUMMARY OF THE INVENTION

According to one first embodiment of the approach, the present invention is based, in the case of a mentioned cylinder-individual leaning to recognize an uneven running change for all cylinders to be tested, on only assuming a reference state and carrying out the ascertainment of an cylinder-individual unequal distribution of lambda on the basis of a comparison of the uneven runnings or uneven running changes which are detected successively or sequentially for the individual cylinders with the uneven running or the uneven running change resulting in the case of this single reference state.

Furthermore, it is to be emphasized that according to the first embodiment of the method according to the present invention, uneven running values or uneven running change values which are detected in a reference phase formed by enrichment (called "reference state") are compared with uneven running values or uneven running change values detected in a sequentially following leaning phase.

According to one alternative embodiment, this comparison takes place during a so-called "compensatory enrichment phase," in which the uneven running or uneven running change of one or multiple cylinders is detected, in each case at least one other cylinder being leaned. Preferably, in each case two cylinders are leaned and enriched in pairs or alternately and the uneven running values of both cylinders are detected in both states, and preferably essentially simultaneously. The uneven running difference between the states of rich operation and lean operation may be ascertained for the mentioned two cylinders (in pairs) by simple difference formation. Due to this measure, the required time period for an entire function passage or for a diagnostic sequence (of all cylinders) is substantially shortened, since for the entire sequence each cylinder is to be leaned only once, while the enrichment phase, generally of equal length, for reference formation, which is provided according to the first embodiment of the method according to the present invention, may be omitted. In the case of an internal combustion engine having an even number of cylinders, the time period for a function passage is reduced in relation to the related art or in relation to the mentioned first embodiment of the method according to the present invention. In the case of an odd number of cylinders, using a more complex pilot control of the compensatory enrichment, the duration of a complete diagnostic passage may also be reduced in relation to the related art.

According to another embodiment of the method according to the present invention, the uneven running values of all compensatorily enriched cylinders may be detected and used or analyzed to determine a lambda unequal distribution of the cylinders, i.e., not only the uneven running values of the cylinders which are leaned or enriched in pairs or alternately as described.

It is to be emphasized that the mentioned leaning to recognize an uneven running change is only preferable and the recognition may be carried out by cylinder-individual trimming, i.e., leaning, enrichment, or a combination of the two.

The method according to the present invention allows a significant acceleration in relation to the related art and an increase of the robustness in the recognition of a cylinder-individual unequal distribution of lambda, in particular also in relation to tolerances in the mass production of exhaust-gas-relevant components of an internal combustion engine.

The present invention may be used in particular in gasoline engines having a catalytic exhaust aftertreatment system and a corresponding lambda sensor regulation. In particular, the method according to the present invention may also be applied in the case of different lambda regulating concepts with the advantages described herein. The method is additionally possible in the case of the recognition, which is required by legislation, of a cylinder unequal distribution, which is affected here, in standard operating situations according to "FTP" (federal test procedure) or "UDC" (urban driving cycles).

Further advantages and embodiments of the present invention result from the description and the appended drawings.

It is understood that the above-mentioned features and the features to be explained hereafter are applicable not only in the particular specified combination, but rather also in other combinations or alone, without departing from the scope of the present invention.

DETAILED DESCRIPTION OF THE INVENTION

Figure 1:
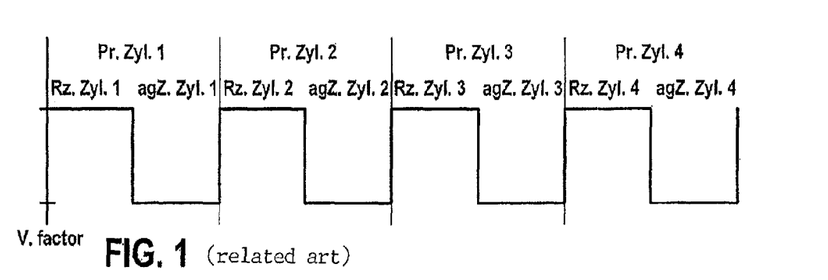
FIG. 1 schematically shows a measuring cycle for determining the lambda irregularity according to the related art.

In FIG. 1, a measuring cycle or test cycle "Pr.Zyl.n," which is carried out on four cylinders n=1-4 in the present case, is shown, particular trimming factor "V.factor" being plotted over the y axis. As is known per se, each cylinder n, starting from reference states "Rz.Zyl.n," which are individually assigned to each cylinder, is set into a state "agZ.Zyl.n," which is leaned in relation to the particular reference state. In each case the difference of the uneven running resulting in the leaned state to the uneven running present in the particular reference state is formed and the (cylinder-individual) irregularity of the lambda values is inferred from the present four difference values thus ascertained. In the case of the four cylinders assumed in the present case, a total of eight individual measurements are therefore necessary.

Figure 2:
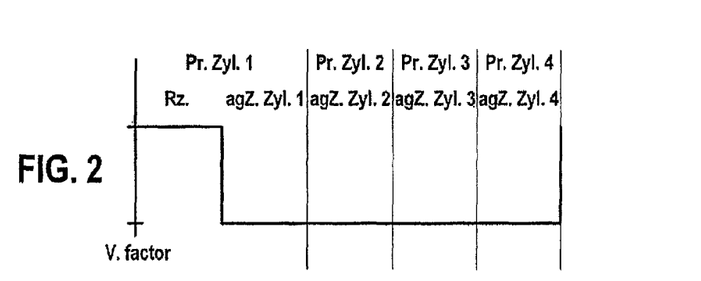
FIG. 2 shows a schematic measuring cycle corresponding to FIG. 1 according to a first exemplary embodiment of the present invention.

As may be seen from FIG. 2, in the case of the measuring cycle according to the present invention, initially a shared reference point "Rz." for all cylinders to be tested is started with and subsequently all cylinders are set into the leaned state successively, i.e., without the interruptions shown in FIG. 1. The particular difference amounts between the uneven running in the leaned state and in the reference state are formed here for all cylinders on the basis of the uneven running ascertained at the beginning of the measuring cycle in the shared reference point. It is to be noted that the detected uneven running values may also be subjected to filtering prior to their further processing, to preferably filter out artifacts, for example, peak values, which would corrupt the result.

Accordingly, the time period for an entire measuring cycle in the case of a four-cylinder engine may be reduced in relation to the related art to ⅝ of the original time by the shared uneven running reference point.

The mentioned values of the uneven running may be ascertained, for example, by a method as described in DE 100 01 274 A1 on the basis of a method for combustion misfire recognition and cylinder equalization in internal combustion engines having a knock control.

The recognition of cylinder-individual lambda errors is based on a conversion of the detected uneven running change into a corresponding lambda error. This conversion is based on characteristic maps which address or correlate a lambda error from the uneven running change and another typical engine variable (for example, rotational speed) as input variables. This characteristic map is determined prior to mass production of the corresponding vehicle components and may therefore deviate due to series tolerances and aging-related and operating-related wear.

According to another exemplary embodiment, the mentioned tolerance-related or operating-related deviations are compensated for in that after a completed measuring cycle or a testing cycle, the sum of the resulting adaptation values for a complete cylinder bank are analyzed as to whether the sum of the adaptation values of the cylinder bank is neutral, i.e., results in zero. This requirement results from the "lambda neutrality" described hereafter. If this sum deviates from the value 0, it is inferred that the mentioned deviations have occurred. To compensate for these deviations, the above-mentioned correlation characteristic map is corrected by the deviation of the mean value.

An above-described correction of the correlation characteristic map should only be carried out, however, if the rotational speed and/or the load of the internal combustion engine during the preceding test cycle was/were constant within predefined threshold values. If this consistency is not provided, the correction of the characteristic map is therefore not carried out. To additionally prevent the characteristic map from being excessively changed by statistical scattering of the underlying measuring data, i.e., to an unjustifiable extent, the dimension of a possible correction of the correlation characteristic map may be filtered or restricted with the aid of weighting factors or the like.

On the basis of recognized cylinder-individual lambda errors, suitable correction factors for the injection of fuel into the particular cylinder are ascertained, the conversion being able to be carried out on the basis of further characteristic maps. These further characteristic maps are preferably ascertained beforehand, specifically within the scope of an application phase on an engine test stand.

An additional acceleration during the calculation of difference amounts between the uneven running in the leaned state and in the reference state may be achieved if the difference of the uneven running from the reference state during testing of the sequentially preceding cylinder and the subsequent uneven running in the event of leaning of the sequentially following cylinder is calculated.

According to another exemplary embodiment, the ascertained values of the uneven running change after leaning of the tested cylinder are stored in a further characteristic map (for example, an array), specifically as a function of the particular underlying values of rotational speed and load. In the case of array points which are not yet occupied with the mentioned data, the ascertainment of uneven running values may be carried out, for example, with the aid of interpolation from data present in the surroundings of this array point. Due to this measure, the robustness of the method is therefore increased in particular in relation to dynamic changes of the operating point of the internal combustion engine, since, with the aid of the further characteristic map, the already ascertained results for individual cylinders do not have to be discarded in the event of such operating point changes, since corresponding values of the uneven running change may be calculated from the third characteristic map, for example, with the aid of interpolation between already present characteristic map data.

In order that the third characteristic map is filled with data as rapidly as possible, according to an alteration of the above-described exemplary embodiment, it is provided that the cylinders, for which heretofore no uneven running changes due to the leaning have yet been detected, are prioritized for the release of the leaning step.

According to another exemplary embodiment, the correction values for all cylinders are formed as mean values from multiple uneven running changes or adaptation values obtained in previous leaning phases. It is ensured by a subsequent mean value correction that the correction factors thus calculated do not cause a change of the (global) lambda mean value for all cylinders (so-called "(total) lambda neutrality").

In the case of some lambda control concepts, it may occur that, for example, to condition the catalytic converter, a mentioned global lambda setpoint value is changed during a lean jump or after a lean jump which has already occurred. In the case of the present testing method, it may therefore be provided in such cases that the output variable (i.e., the mentioned setpoint value) of the lambda control is detected during the measuring cycle and a possibly existing change of this variable in the event of the lean jump is taken into account. Thus, for example, in the case in which the output variable of the lambda control is changed toward lean by 5% during testing of the first cylinder, the present adaptation value of the measuring cycle is accordingly increased by 5% to compensate for this change.

Another exemplary embodiment is based on the finding that lean errors, i.e., lambda deviations caused by excessively small metering quantities in a cylinder, already result in a substantial emission increase in the case of relatively small deviations, while in contrast rich errors, i.e., lambda deviations caused by excessively large metering quantities, only become emission-relevant at all from relatively large deviations.

This asymmetry may have the result that a large rich error may result, due to the mentioned global correction of the lambda controller (lambda neutrality), in a lean error on the remaining cylinders. Thus, for example, the situation may occur that cylinder 1 has a rich error of 40%, i.e., a fuel quantity which is excessively large by 40% is metered to cylinder 1. Due to the lambda neutrality, this results in a shift of the global lambda value, which is compensated for in the case of a four-cylinder engine by the lambda control by a lean shift of all cylinders by 10% in each case. Following this correction, the quantity error is +30% in cylinder 1 and in each case −10% in the remaining cylinders. A cylinder equalization according to the related art would therefore carry out a quantity correction of −30% on cylinder 1 and in each case a quantity correction of +10% on cylinders 2 through 4.

Due to the lambda neutrality, a differentiation of rich errors or lean errors of individual cylinders is moreover not possible in principle. Thus, in a four-cylinder engine, a 30% rich error present only in two cylinders results, due to the intervention of the lambda controller, in equal adaptation or correction values as a 30% lean error, also on two cylinders. To be able to make a mentioned differentiation, the intervention data delivered by the lambda controller are therefore analyzed in greater detail. In the above-mentioned case of a 30% rich error on cylinders 1 and 2, the lambda controller will carry out a lean trimming of all cylinders. After intervention of the lambda controller, cylinders 1 and 2 will have a 15% rich trimming; cylinders 3 and 4 will have a 15% lean trimming, which are compensated for appropriately by the described adaptation method. The present invention provides for not solely comparing the adaptation values to the error thresholds, but rather the sum of adaptation values and lambda controller correction. In the mentioned example, the adaptation values of 15% and the correction of the lambda controller of 15% would result in a total error of 30% in cylinders 1 and 2, while in cylinders 3 and 4, the sum of lambda controller and adaptation value is 0%.

A recognition of lean errors is only possible with relatively large inaccuracy due to the system. This inaccuracy is remedied by the combination of rich jumps and lean jumps shown in FIG. 4. According to this exemplary embodiment, initially a measuring cycle having (above-described) lean jumps is carried out. If it proves, as in the present example, that suspicion of an excessively lean lambda value exists in one cylinder, a further measuring cycle "Start.Mz" is subsequently started for the same cylinder bank, in which a rich jump takes place; however, i.e., the cylinders to be tested are sequentially trimmed by a rich jump and the uneven running change resulting therefrom is analyzed according to the above-described method.

Figure 5:
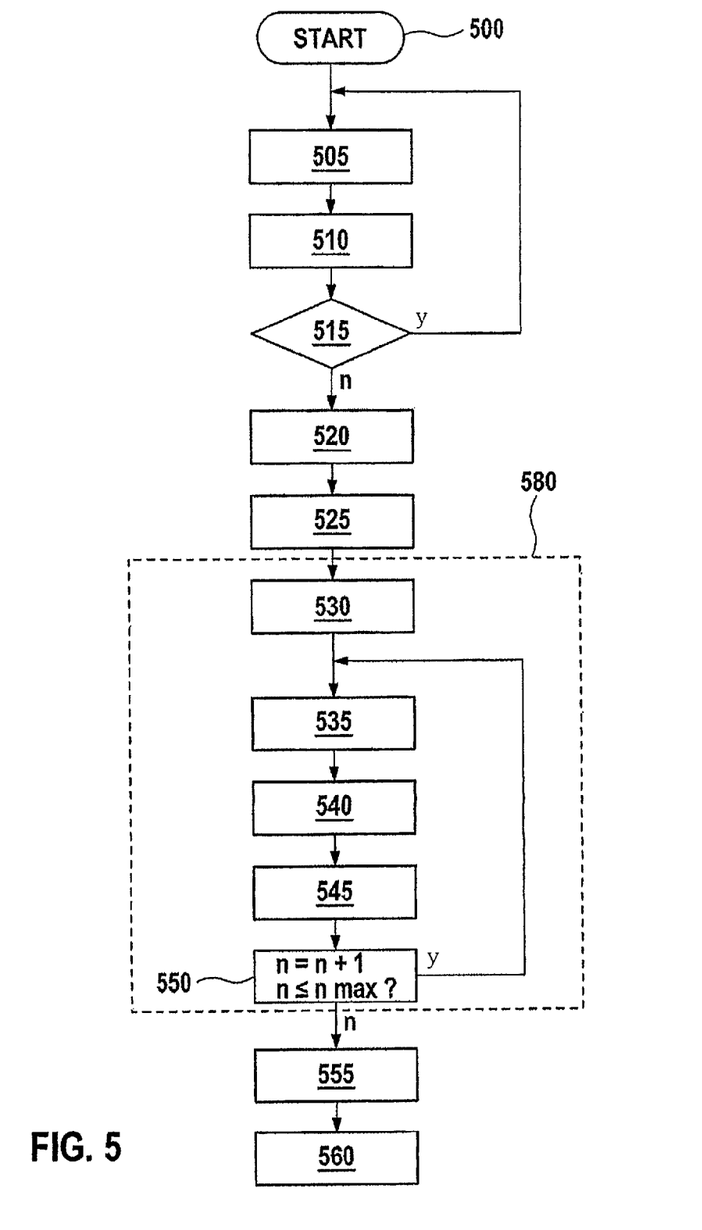
FIG. 5 shows an exemplary embodiment of the method according to the present invention on the basis of a flow chart.

FIG. 5 shows an exemplary embodiment of the method according to the present invention on the basis of a flow chart. After start 500 of the routine shown, initially the mentioned reference state is approached 505. After the reference state has resulted, the rotational speed and/or the load of the internal combustion engine is/are detected 510. The detected values of the rotational speed and/or the load are then compared to a threshold value 515. If the threshold value is exceeded for at least one of the two variables, i.e., an excessively large rotational speed change and/or excessively large load change of the internal combustion engine for the detection of an informative uneven running change has resulted due to the approach of the reference state, the sequence jumps back again to step 505 and a reference point deviating from the preceding reference point is approached, to avoid the threshold value again being exceeded in step 515. The measuring cycle and the leaning steps connected thereto are terminated or not carried out due to this jump back.

Figure 3:
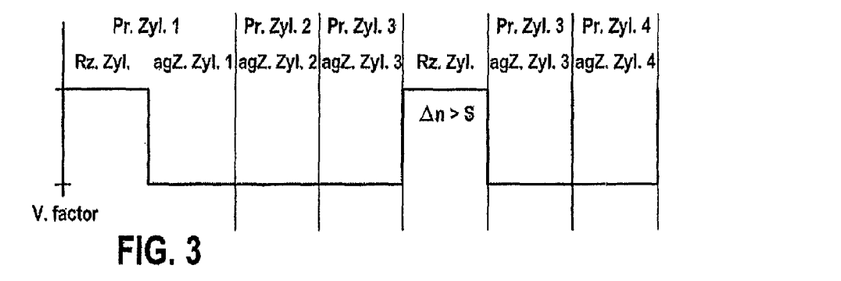
FIG. 3 shows a corresponding measuring cycle according to a second exemplary embodiment of the present invention.

As may also be seen from FIG. 3, instead of restarting the entire routine, it may also be provided that the mentioned comparison of the rotational speed change with the at least one threshold value "S," i.e., a comparison according to equation $\Delta n > S$, is also carried out during a measuring cycle, in the exemplary embodiment shown in FIG. 3, only the testing step affecting cylinder 3 being terminated and then a new reference state being approached, to carry out the leaning of cylinder 3 again at this changed reference point.

If test 515 has the result that the threshold value or threshold values was/were not exceeded, the uneven running or uneven running change is detected according to the above-described method in step 520. The value of the uneven running/uneven running change detected in the reference state is stored 525, to be available for the following calculation steps.

The described leaning of the individual cylinders takes place in the following method steps, which are delimited by dashed line 580. It is to be noted that instead of the leaning steps described hereafter, enrichment steps or an above-mentioned combination of leaning steps and enrichment steps may also take place.

In step 530, a counter, which identifies the particular cylinder to be tested, is initially set to starting value n=1. For cylinder n, an above-described leaning is carried out 535 and after completed leaning, the resulting uneven running or uneven running change is detected according to step 540. The value of the uneven running thus detected is stored 545 and in step 550 the counter value is increased according to n=n+1. If the increased counter value is less than or equal to the number of the cylinders to be tested, the sequence jumps back to step 535 and a leaning is carried out accordingly for cylinder n now present. Steps 540 through 550 are then carried out for the present cylinder.

If step 550 has the result that all cylinders have already been tested, according to step 555, difference values of the uneven running values stored in step 545 for all cylinders are formed using the uneven running reference value stored in step 525. A value for the lambda imbalance is calculated in step 560 on the basis of these difference values.

Figure 6:
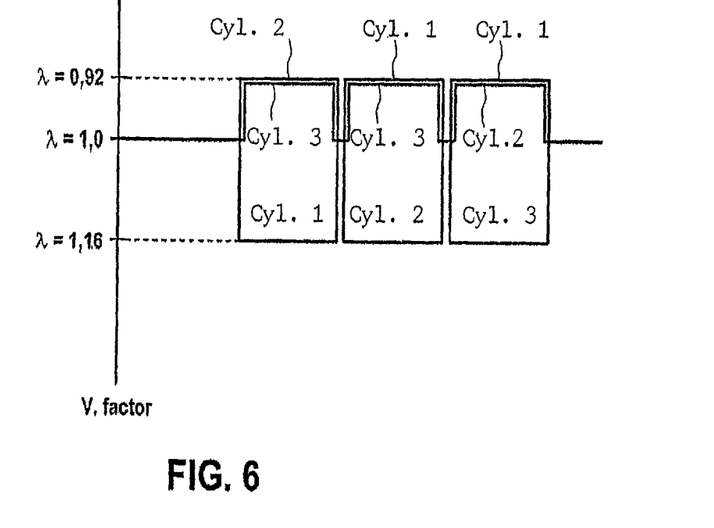
FIG. 6 shows a schematic measuring cycle, corresponding to FIG. 1, according to a fourth exemplary embodiment of the present invention, specifically for the case of a three-cylinder internal combustion engine.
Figure 7:
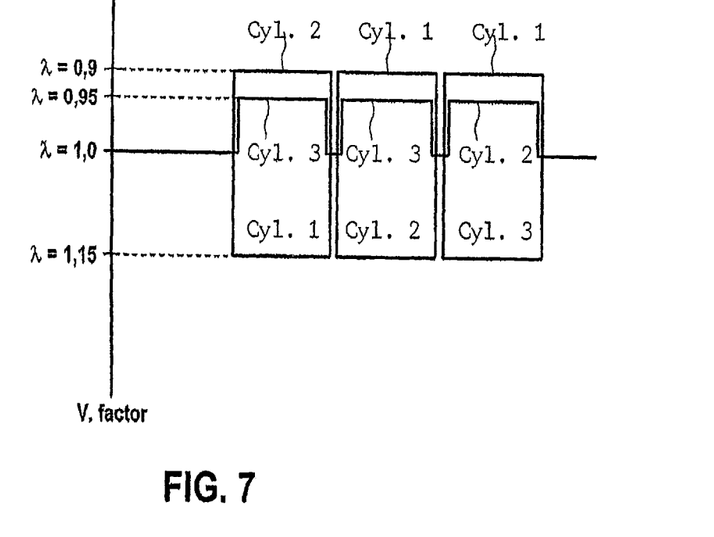
FIG. 7 shows a measuring cycle corresponding to FIG. 6 according to a fifth exemplary embodiment of the present invention.

FIGS. 6 and 7 show schematic measuring cycles, corresponding to FIG. 1 in the case of a three-cylinder internal combustion engine, according to a fourth exemplary embodiment and a fifth exemplary embodiment of the method according to the present invention.

In the fourth exemplary embodiment shown in FIG. 6, the three cylinders "cylinder 1," "cylinder 2," and "cylinder 3," starting from an untrimmed state having the value lambda=1.0, are successively or sequentially, and specifically in the present case in three trimming phases, each trimmed simultaneously in relation to the lambda value of 1.0, and specifically in each case using a trimming factor "V.factor," so that the overall resulting lambda value in the particular trimming phase essentially results in the value 1.0. Thus, in the present exemplary embodiment, in the first of the three trimming phases, the two cylinders "cylinder 2" and "cylinder 3" are enriched (or trimmed) to the essentially same lambda value 0.92, while in contrast cylinder "cylinder 1" is leaned to a lambda value of approximately 1.6. The arithmetic total of the mentioned three lambda values essentially results in the desired lambda value of 1.0.

In the second trimming phase, the two cylinders "cylinder 1" and "cylinder 3" are in turn enriched to essentially the same lambda value 0.92, while in contrast cylinder "cylinder 2" is leaned in turn to the lambda value of approximately 1.16. In the third trimming phase, the two cylinders "cylinder 1" and "cylinder 2" are in turn enriched to essentially the same lambda value 0.92, while cylinder "cylinder 3" is in turn leaned to the lambda value of approximately 1.16.

Figure 4:
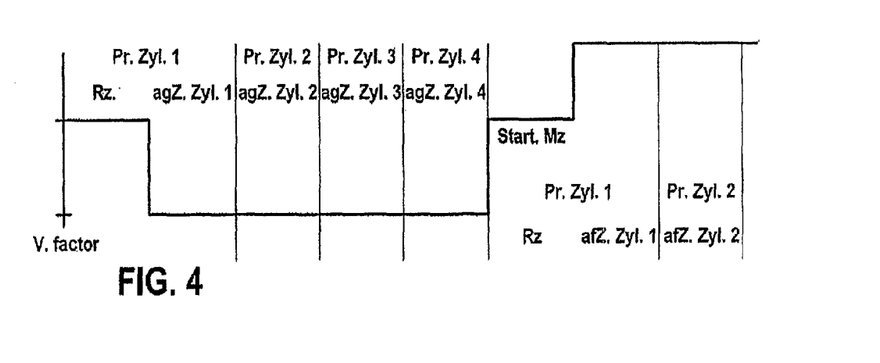
FIG. 4 shows a corresponding measuring cycle according to a third exemplary embodiment of the present invention.

Instead of a pre-enrichment, the detection of uneven running values and the calculation of an averaged uneven running of a specific cylinder is carried out in the present case in phases of a compensating, enriching lambda trimming, at least one of the remaining cylinders being leaned. Dispensing with the necessity of pre-enrichment, in contrast to the exemplary embodiments according to FIGS. 2 through 4, is already advantageous per se due to the further simplification of the measuring method.

It is to be emphasized that the number of cylinders and the mentioned lambda values are only examples and therefore may also assume other values, if the above-mentioned conditions are met, for example, relating to the resulting lambda value essentially equal to 1.0. It is also to be emphasized that an implementation in an internal combustion engine having an even number of cylinders offers further advantages, since in each case two cylinders (i.e., in pairs) may alternately first be leaned or enriched essentially simultaneously, and then enriched or leaned essentially simultaneously. These advantages also result in the case of multicylinder internal combustion engines, for example, eight-cylinder internal combustion engines having, for example, two cylinder banks.

Furthermore, it is to be emphasized that the described method, i.e., the corresponding enrichment or leaning steps, and the advantages resulting therefrom, are independent of the number of cylinders. The requirement is only the applicability of a described trimming having different lambda values for the leaning and the enrichment. The particular cylinders which are not taken into account, i.e., the third cylinder in a three-cylinder internal combustion engine or the fourth cylinder in a four-cylinder internal combustion engine, are trimmed compensatorily in such a way that the sum of the lambda values essentially or preferably results in the value 1.

In the fifth exemplary embodiment shown in FIG. 7 of the method according to the present invention, the three cylinders are trimmed differently. Again starting from an untrimmed state having the value lambda=1.0, the three cylinders "cylinder 1," "cylinder 2," and "cylinder 3" are again trimmed successively or sequentially, and specifically again in three trimming phases, essentially simultaneously, and again using a trimming factor "V.factor (rich)" and "V.factor (lean)," so that the lambda value resulting overall in the particular trimming phase essentially results in the value 1.0.

Thus, in the present exemplary embodiment, in the first of the three trimming phases, the two cylinders "cylinder 2" and "cylinder 3" are enriched, specifically cylinder "cylinder 2" to a lambda value of approximately V.factor (rich) 0.9. In contrast, cylinder "cylinder 1" is leaned to a lambda value of approximately 1.15. Cylinder "cylinder 3" is enriched compensatorily to a lambda value of approximately 0.95. The arithmetic total of the mentioned three lambda values also essentially results here in the lambda value 1.0.

In the second trimming phase, the two cylinders "cylinder 1" and "cylinder 3" are enriched, and specifically cylinder "cylinder 1" is enriched to the lambda value of approximately 0.9 and cylinder "cylinder 3" to the lambda value of approximately 0.95. In contrast, cylinder "cylinder 2" is leaned to the lambda value of approximately 1.15. In the third trimming phase, the two cylinders "cylinder 1" and "cylinder 2" are enriched, specifically cylinder "cylinder 1" is enriched to the lambda value of approximately 0.9 and cylinder "cylinder 2" to the lambda value of approximately 0.95. In contrast, cylinder "cylinder 3" is leaned to the lambda value of approximately 1.15.

According to the fifth exemplary embodiment, the analysis of the uneven running is carried out not only for the leaned cylinders, but rather also for the cylinders which are enriched asymmetrically (compensatorily) in the present case. The three uneven running change values, which may be analyzed, result from the uneven running values upon leaning using V.factor (lean) and enrichment using V.factor (rich). Upon consideration of all enrichment/leaning phases of all cylinders, a total of nine different uneven running or uneven running change values, which may be analyzed, even result in total here after the passage of the three trimming phases. This relatively large number of uneven running values, which are detected in a chronologically short measuring interval, allows a significant improvement of the speed and the robustness of the described method for lambda-based cylinder equalization in relation to the related art.

In the case of an internal combustion engine having an even number of cylinders, the sequential trimming in pairs of two cylinders at a time is advantageous in that after passage of the leaning and enrichment phases for the particular cylinder pair, the differences of the uneven running between rich trimming and lean trimming for the two cylinders—under otherwise identical conditions—may already be formed and analyzed. If the diagnosis must be interrupted in the further course of time due to boundary conditions which are no longer met, when the diagnosis is resumed, the trimming of the already analyzed cylinder pair may be omitted, whereby the remaining duration of the diagnosis is shortened accordingly. The boundary conditions must thus only be met without interruption at least for the duration of the sequential trimming of two cylinders to achieve a partial result for the diagnosis in each case.

It is additionally to be noted that the mentioned leaning and enrichment in pairs has the advantage that a result is already provided after trimming of only two cylinders. If the mentioned boundary conditions with respect to the rotational speed and load or other interfering variables are omitted, the measured uneven running values are already analyzable, since the uneven running was already detected in the rich state and in the lean state for each of the two cylinders. Since in this exemplary application, no repeated measurements are necessary, the method according to the present invention may be carried out relatively rapidly in this case.

Due to the described method, the terminations occurring according to the related art in the event of the load point changes which are required in normal operation of the internal combustion engine are effectively avoided in the recognition, so that the requirements mentioned at the outset for the standard measuring cycles according to FTP or UDC may be fulfilled.

The described method may be implemented either in the form of a control program in an existing control unit for controlling an internal combustion engine or in the form of a corresponding control unit.

What is claimed is:

1. A method for cylinder equalization of a lambda-controlled internal combustion engine of a motor vehicle, comprising:
trimming selected cylinders with respect to a mixture composition of metered fuel;
detecting one of an uneven running or uneven running change of the internal combustion engine caused by the trimming of the selected cylinders, wherein the one of the uneven running or uneven running change is detected in a reference state of the internal combustion engine;
detecting one of uneven runnings or uneven running changes during successive trimmings of the selected cylinders; and
performing cylinder equalization on the basis of a comparison of the one of the uneven running or uneven running change detected in the reference state to the one of the uneven runnings or uneven running changes detected during the successive trimmings.

2. A method for cylinder equalization of a lambda-controlled internal combustion engine of a motor vehicle, comprising:
trimming selected cylinders with respect to a mixture composition of metered fuel;
detecting at least one of uneven runnings or uneven running changes of the internal combustion engine caused by the trimming of the selected cylinders, wherein uneven runnings or uneven running changes which are detected in at least two successive trimming phases of the internal combustion engine are detected, and wherein in each of the at least two successive trimming phases at least one cylinder is enriched and at least one further cylinder is leaned essentially simultaneously; and
performing cylinder equalization on the basis of a comparison of the uneven runnings or uneven running changes which are detected in the at least two successive trimming phases.

3. The method as recited in claim 2, wherein uneven runnings or uneven running changes of at least one cylinder are detected in a compensatory enrichment phase, and wherein during the compensatory enrichment phase at least one further cylinder is leaned in such a way that the overall trimming resulting during the compensatory enrichment phase essentially results in the value zero, and uneven running differences between the two trimming phases of rich operation and lean operation of at least two cylinders are each ascertained by difference formation.

4. The method as recited in claim 3, wherein at least two cylinders are essentially simultaneously alternately leaned and enriched, and the uneven runnings or uneven running changes of the at least two cylinders in the two trimming phases are detected and analyzed.

5. The method as recited in claim 4, wherein the uneven runnings or uneven running changes of all compensatorily enriched cylinders are detected and analyzed.

6. The method as recited in claim 3, wherein the detected uneven running values are filtered prior to further processing.

7. The method as recited in claim 3, wherein the detected uneven running values are converted with the aid of a first characteristic map into a respective lambda error, and each respective cylinder is adapted based on the lambda error.

8. The method as recited in claim 7, further comprising:
determining whether a sum of adaptation values used for the adaptation of the cylinders is essentially zero; and
correcting a first characteristic map in the case the sum of the adaptation values deviates from zero by more than a predefined value.

9. The method as recited in claim 8, wherein a correction of the first characteristic map is carried out only if at least one of a rotational speed and a load of the internal combustion engine is essentially constant during the determining of the sum of the adaptation values.

10. The method as recited in claim 7, wherein correction values for metering of fuel into the respective cylinders are ascertained from the lambda errors.

11. The method as recited in claim 7, wherein the uneven running values detected on successively tested cylinders are compared.

12. The method as recited in claim 7, wherein the detected uneven running values are stored in a further characteristic map, and wherein fields of the further characteristic map for which uneven running values are not yet present are interpolated with the aid of already present uneven running values.

13. The method as recited in claim 12, wherein fields of the further characteristic map for cylinders, for which uneven running values are not yet present, are prioritized during the detection of uneven running values.

14. The method as recited in claim 8, wherein the adaptation values are formed as mean values from present and previously obtained adaptation values.

15. The method as recited in claim 8, wherein the adaptation values are calculated by taking into consideration correction values of the lambda controller.

16. A non-transitory computer-readable data storage medium storing a computer program having program codes which, when executed on a computer, performs a method for cylinder equalization of a lambda-controlled internal combustion engine of a motor vehicle, the method comprising:

trimming selected cylinders with respect to a mixture composition of metered fuel;

detecting one of an uneven running or uneven running change of the internal combustion engine caused by the trimming of the selected cylinders, wherein the one of the uneven running or uneven running change is detected in a reference state of the internal combustion engine;

detecting one of uneven runnings or uneven running changes during successive trimmings of the selected cylinders; and performing cylinder equalization on the basis of a comparison of the one of the uneven running or uneven running change detected in the reference state to the one of the uneven runnings or uneven running changes detected during the successive trimmings.

17. A non-transitory computer-readable data storage medium storing a computer program having program codes which, when executed on a computer, performs a method for cylinder equalization of a lambda-controlled internal combustion engine of a motor vehicle, the method comprising:

trimming selected cylinders with respect to a mixture composition of metered fuel;

detecting at least one of uneven runnings or uneven running changes of the internal combustion engine caused by the trimming of the selected cylinders, wherein uneven runnings or uneven running changes which are detected in at least two successive trimming phases of the internal combustion engine are detected, and wherein in each of the at least two successive trimming phases at least one cylinder is enriched and at least one further cylinder is leaned essentially simultaneously; and performing cylinder equalization on the basis of a comparison of the uneven runnings or uneven running changes which are detected in the at least two successive trimming phases.

* * * * *